United States Patent
Green et al.

(10) Patent No.: US 6,625,255 B1
(45) Date of Patent: Sep. 23, 2003

(54) APPARATUS AND METHOD FOR COMMUNICATIONS LOOP CHARACTERIZATION

(75) Inventors: Lester L. Green, Chelsea, MA (US); Charles H Bianchi, Durham, NH (US); Edward James Arsnow, Lynnfield, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/378,970

(22) Filed: Aug. 23, 1999

(51) Int. Cl.[7] .......................... H04M 1/24; H04M 3/08; H04M 3/22
(52) U.S. Cl. ................. 379/1.04; 379/15.03; 379/22.04; 379/27.01
(58) Field of Search ...................... 379/1, 1.04, 10.01, 379/10.02, 10.03, 15.03, 22, 22.01–22.02, 22.04, 27.01, 27.02–27.03, 29.05, 32.04

(56) References Cited

U.S. PATENT DOCUMENTS

| | | | | |
|---|---|---|---|---|
| 5,881,131 A | * | 3/1999 | Farris et al. |
| 6,058,162 A | * | 5/2000 | Nelson et al. |
| 6,091,713 A | * | 7/2000 | Lechleider et al. |
| 6,459,702 B1 | * | 10/2002 | Saaverda et al. |

* cited by examiner

Primary Examiner—Duc Nguyen

(57) ABSTRACT

A system in accordance With the principles of the present invention employs a loop field test to predict the data rate capability of at least one loop other than the one tested. A local telephone loop is selected for field testing that includes wideband noise testing and signal frequency testing. This reference loop is characterized in response to the results of the field tests and the characterization is used to predict the data handling capability of other similar loops. In an illustrative embodiment one loop Within each binder group terminated at a telephone office is selected as a reference loop and the data rate capability of the other loops Within the binder group are predicted, based on the characterization of the reference loop.

31 Claims, 5 Drawing Sheets

APPARATUS AND METHOD FOR COMMUNICATIONS LOOP CHARACTERIZATION

FIELD OF THE INVENTION

The invention relates to telecommunications systems and, more particularly, to the characterization of subscriber loops, that is, of the connection between a telephone office and subscriber premises.

BACKGROUND OF THE INVENTION

In eighteen seventy-six, inside a third floor walk-up garret apartment in the Scollay Square section of Boston Massachusetts, only a short distance from the sight of the first battle of the revolutionary war, Alexander Graham Bell spoke the first words transmitted over telephone wires. Bell's transmission of sound over telephone wires initiated a revolution in communications whose scope rivals that of the political revolution initiated by the sound, heard nearby, of "the shot heard round the world."

Technical innovations have dramatically transformed the telecommunications industry in the ensuing years. For example, telecommunications switching systems have evolved considerably from "hand operated" systems in which one instrument was electrically connected (through a hierarchical switching network) to another with the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS, e.g., 5ESS), in which the instruments are automatically connected through the network by electronic systems. Nevertheless, such switching systems often still employ circuit switching, a technique which yields highly reliable service, particularly for such "real time" communications applications as voice, in which the momentary loss of a channel is annoying, and repeated such losses are unacceptable.

Not only has switching technology undergone major changes, the type of traffic being carried on telephone lines has also changed dramatically. Although originally designed for voice traffic and "tuned" to operation in the voice band between approximately 350 and 4000 Hz, the telecommunications infrastructure also carries data, through the use of various channels, or signals, such as tones. However, with the growing use of the Internet, and the potential development such high bandwidth applications such as interactive distance-learning and video on demand, the existing telecommunications infrastructure is in danger of being overwhelmed. A large portion of the system's transmission medium has been replaced with high speed trunks which employ fiber optic transmission media, microwave media, and line of sight optical media, for example, to meet the ever mounting demand for high speed data transmission capability. However, a huge installed base of transmission media, composed primarily of twisted pair copper wire, forms the telecommunications path from service providers' central offices to customer premises. Designed for low-frequency voice grade operation, this "last mile" of connectivity presents a bottleneck to high-speed operations.

Nevertheless, technologies, such as digital subscriber line (DSL) provide relatively high-speed data transmission over this somewhat archaic installed base of copper local loops. To provide such high speed data services over copper lines, a provider, such as a local telephone operating company, may estimate the transmission capacity of all the local loops that terminate within a given central office, and offer a "blanket" service for all those loops. For example, a local telephone service provider may estimate or otherwise determine that 1.54 Mbps DSL service may be provided to a number of customers whose local loops are terminated a given central office. Typically, the local telephone service provider will not know the data-transmission capacity of each of the loops thus terminated and, by using an estimate with a margin of safety, will waste a significant amount of unused capacity. That is, many of the loops terminated at the central office may be capable of providing significantly higher data rate operations but, because the local service provider has no idea which loops, if any, are capable of supporting higher speed transmissions, the service provider guarantees operations at a much lower data rate than might be supported by some number of loops associated with the central office. Additionally, even with a margin of error built in to the service offerings, some of the loops may not be capable of handling the guaranteed data rate and, as a result, costly reconfigurations may be required to upgrade a customer's service to the guaranteed level. A system for accurately characterizing the data transmission capacity of local loops would therefore be highly desirable.

SUMMARY

A system in accordance with the principles of the present invention employs a loop field test to determine the characteristics of a reference loop. This characterization is then used to predict the data transmission capability of at least one similar loop. In accordance with the principles of the invention, a local loop may be selected for testing and have field tests performed on it. The loop may be characterized, based on the results of the field test, and the data rate capability of other loops having similar characteristics may be predicted, based on the data rate capability of the field-tested loop. In an illustrative embodiment, the field test includes wideband noise testing of the selected loop. A transfer function of the field-tested loop is developed, based on the results of these tests. The similar loops whose data rate performances may be predicted on the basis of the reference loop characterization may be selected on the basis of geographic similarity, for example.

Thousands of local loops may be serviced by, or terminated in, a given central office. In accordance with the principles of the present invention, the local loops may be divided into a number of geographically diverse routes, each of which may be subject to differing environmental factors, such as electromagnetic interference. The differing environmental factors typically impose corresponding limits on the data transmission capability of the local loops. Each of the geographically diverse route cables may be further divided into carrier service area (CSA) groups, and the loops within a binder group may be cross connected at a binder post to provide service to a particular area. In an illustrative embodiment in which a central office serves 30,000 local loops, and is divided into six geographically diverse routes, the geographically diverse routes each includes ten binder posts, each binder post includes ten binder groups and each binder group includes fifty local loops. In this illustrative embodiment at least one local loop, referred to as a reference loop, within each binder group is field tested. The tested local loop, a reference loop, is characterized, at least in part, by the development of a transfer function. This characterization is used to predict the data rate capability of other local loops within the binder group.

In accordance with another aspect of the invention, one or more digital subscriber line modems may be qualified on the tested loop and, by extension, on similar loops. "Similar loops" may refer to loops within the same binder group.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

In order to provide an accurate portrait of the data-handling capabilities of the many thousands of local loops associated with a telephone office, and to thereby permit service providers to offer communications services with a high degree of confidence, a system and method in accordance with the principles of the present invention field tests at least:one local loop and uses the tested loop as a reference loop. In accordance with the principles of the invention, a local loop may be selected for testing based upon anticipated similarities between the test loop and other loops. For example, geographic similarities may be used to select a reference loop within each binder group associated with a telephone office and the characterization of that reference loop may be used to predict the data rate performance of other loops within the same binder group. Other criteria may be employed, either separately or in concert with geographic relationships, to categorize loops as "similar" and to thereby predict the performance of a loop that is similar to a reference loop.

Figure 1:
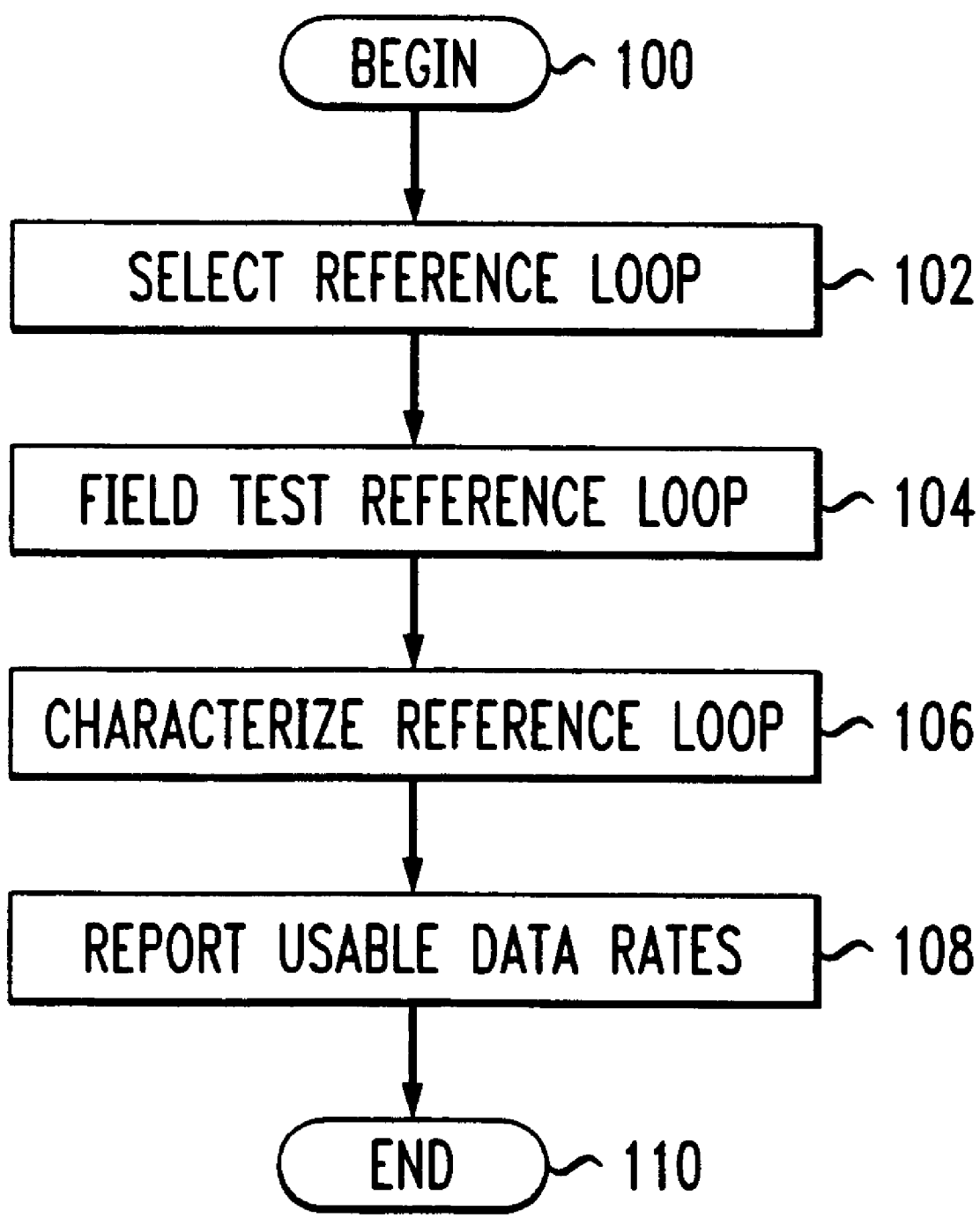
FIG. 1 is a flow chart, which illustrates a process of predicting the data transmission capability of various local loops associated with a telephone office.

The flow chart of FIG. 1 illustrates the steps involved in predicting the data rate performance of one or more local loops associated with a telephone office in accordance with the principles of the present invention. The process begins in step 100 and proceeds from there to step 102 where a reference loop is selected for field-testing. The reference loop, illustratively a "spare", or inactive loop, is selected to represent one or more similar loops, so that the results of the field tests may reasonably be extrapolated to the similar loops. Thus, the selection of a reference loop may be made on the basis of geographical similarity, for example. That is, thousands of local loops may be serviced by, or terminated in, a given telephone office. In accordance with the principles of the present invention, the local loops may be divided into a number of geographically diverse routes, each of which may be subject to differing environmental factors, such as electromagnetic interference and other forms of electrical noise. The differing environmental factors typically impose corresponding limits on the data rate capability of the local loops within the geographically diverse routes. Each of the geographically diverse route cables may be further divided into carrier service area (CSA) groups, and the loops within a binder group may be cross connected at a binder post to provide service to a particular area. In an illustrative embodiment in which a central office serves 30,000 local loops, and is divided into six geographically diverse routes, each include ten binder posts, each binder post includes ten binder groups, and each binder group includes fifty local loops. In this illustrative embodiment at least one local loop is selected as a reference loop within each binder group.

After selecting a reference loop in step 102, the process proceeds to step 104 where the selected reference loop is tested. In particular, the reference loop is field tested to develop an attenuation versus frequency profile, a flat noise figure, and a coupled noise profile. After field testing the selected reference loop, the process proceeds to step 106 where the reference loop is characterized. This characterization may include the development of a transfer function which models the effects, such as attenuation, flat noise, and coupled noise, of the reference loop on signals, such as tones, transmitted through it. The loop characterization is effected for all usable signal frequencies within the characterized bandwidth. The characterized bandwidth may be an asymmetrical digital subscriber line (ADSL) bandwidth, for example. This characterization may then be extrapolated to other similar local loops. In an illustrative embodiment "similar loops" are those loops that are located within the same binder group.

In addition to the field test results, the characterization may incorporate Loop Facilities Assignment and Control System (LFACS) loop record data, which is typically maintained by a service provider in a LFACS database. Such data as Mechanized Loop Testing (MLT) data and/or other equivalent automatic measurement data also typically maintained by a service provider, may be incorporated with the LFACS data and used in the characterization of the reference loop and similar loops. To that end, the loop configuration characteristics stored within the LFACS database and electrical characteristics stored within the MLT may be merged and correlated with each loop terminated in the telephone office of interest. A merged database of information derived from the LFACS/MLT data, including data related to line parameters such as loop length, DC voltage, impedance, and longitudinal balance may be created for each loop. As previously described, each of the loops may be associated with a binder group, binder post, and geographically diverse route. In an illustrative example at least one reference loop within each binder group at each binder post location in each geographically diverse route is tested for attenuation and noise characteristics at the various signal frequencies to be employed in services such as ADSL.

From step 104 the process proceeds to step 106, where the data handling capability of loops similar to the reference loop is determined. This determination may take the form of a simulation that takes into account the characterization data of step 104, along with the LFACS and MLT data. Additionally, the loop characteristics of the reference loop that are developed in step 104 may be employed to qualify various modems for operation on loops similar to the reference loop. That is, the reference loop characteristics may be employed in a simulation of similar loops, using actual models of various modem pairs, to determine various data rate capabilities using the various modems at different take rates, such as 5% and 10% take rates. This modem qualification may take the form of qualifying a modem pair on each category of loops, with each binder group forming a category, for example, associated with a telephone office. The qualification may be, for example, for a variety of signal to noise ratios, acceptable bit error rates, and expected take rates within a cable.

In step 108, usable data rate ranges are reported. This report may be in the form of an array of predicted rates at given signal to noise ratios, bit error rates, type of modem, and take rates. A service provider may employ these predicted data rates to optimize the data handling of loops terminated within the associated telephone office. This array may be implemented as a database contained within an electronic medium, such as a disk or tape, or it may be in the form of a computer printout, for example. Each record may include a cable number, loop number and low and high predicted data rates for 5% and 10% take rates. From step 108 the process proceeds to end in step 110.

Figure 2:
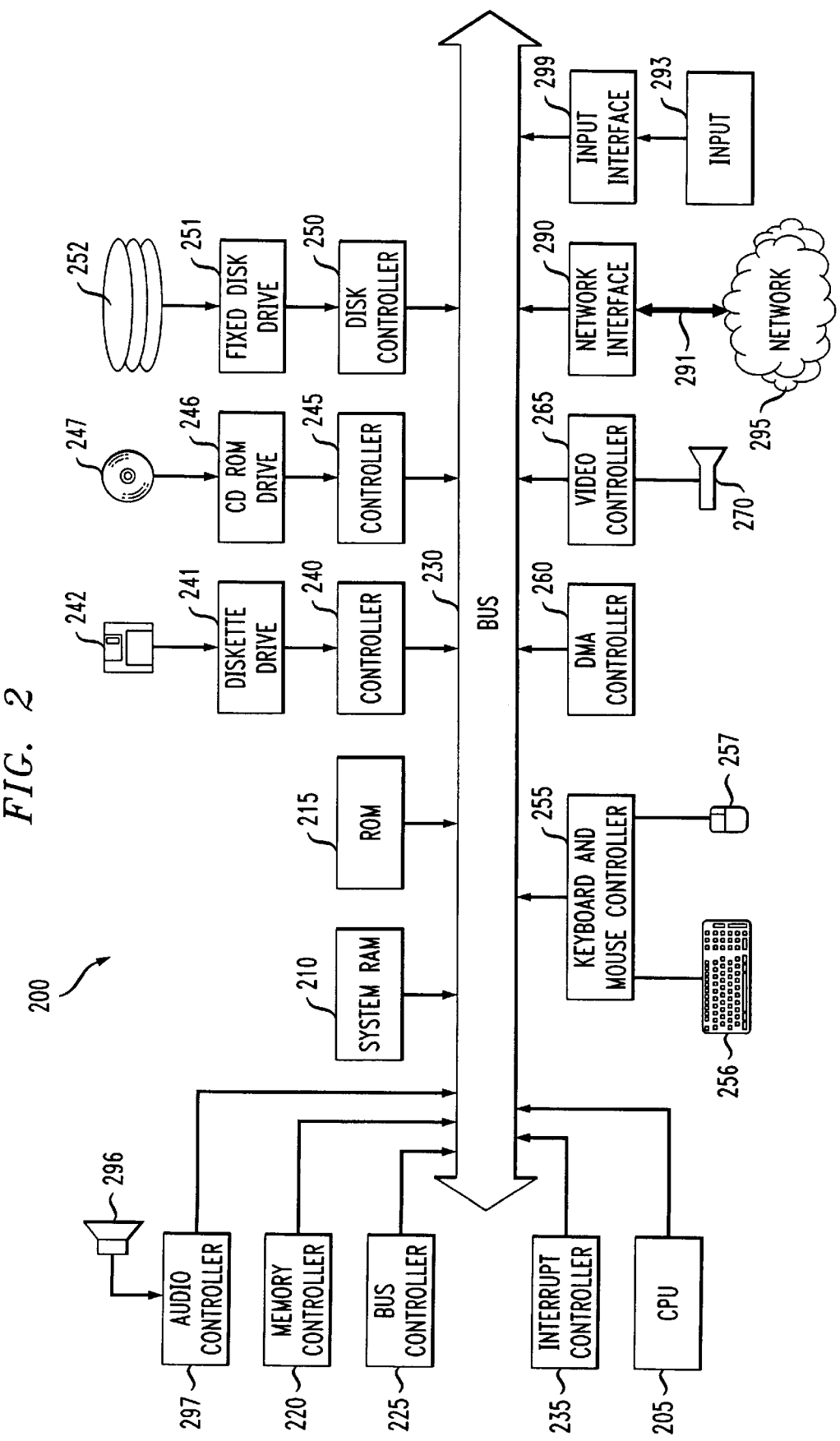
FIG. 2 is a block diagram of a computer such as may be employed in the process of predicting the data transmission performance of local loops in accordance with the principles of the present invention.

A number of the Loop characterization and simulation functions may be performed on general-purpose computer, specialized simulation equipment, or a combination of both. For example, the general-purpose computer of FIG. 2 illustrates the system architecture for a computer system 100 such as an IBM PS/2®, on which various aspects of the invention may be implemented. The exemplary computer system of FIG. 2 is for descriptive purposes only. Although the description may refer to terms commonly used in describing particular computer systems, such as in IBM PS/2 computer, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD-ROM 247, or hard drive 252. Data and software may be exchanged with computer system 200 via removable media such as diskette 242 and CD-ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adapter 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device.

Operation of computer system 200 is generally controlled and coordinated by operating system software, such as the OS/2® operating system, available from International Business Machines Corporation, Boca Raton, Florida. The operating system controls allocation of system resources and performs tasks such as processing scheduling, memory management, networking, and I/O services, among things. In particular, an operating system resident in system memory and running on CPU 205 coordinates the operation of the other elements of computer system 200. The present invention may be implemented with any number of commercially available operating systems including OS/2, UNIX and DOS, etc. In accordance with the principles of the present invention, the computer system 200 is employed to characterize a reference loop, which characterization may include the development of a transfer function which describes the reference loop. The computer 200 may also be employed in the simulation of the reference loop and other loops terminated within the telephone office.

Figure 3:
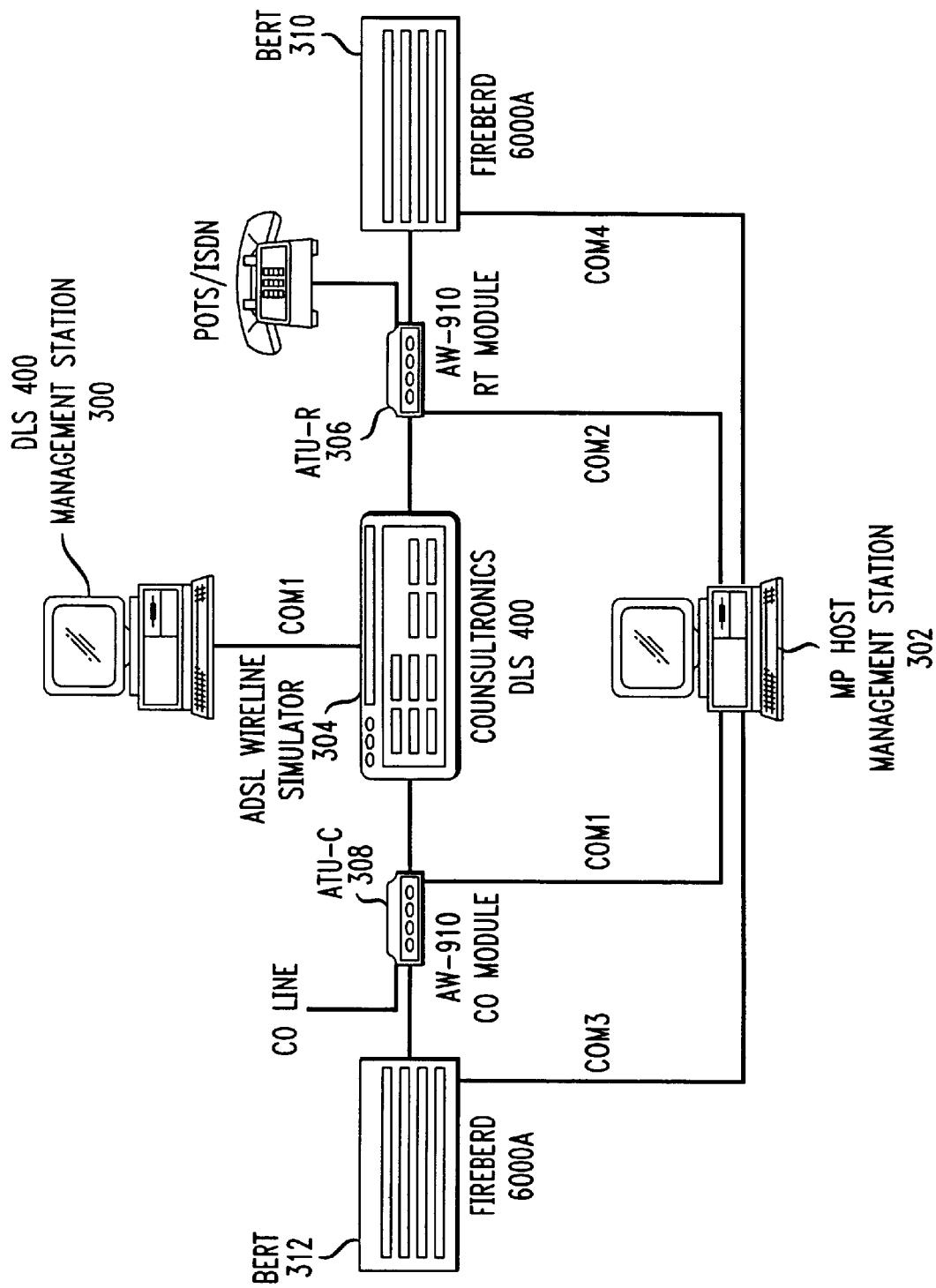
FIG. 3 is a block diagram of a modem qualification arrangement in accordance with the principles of the present invention.

The block diagram of FIG. 3 depicts a modem qualification setup in accordance with the principles of the present invention. The DLS 400 management system 300 may be implemented on a computer such as computer 200 discussed in relation to FIG. 2. The MP Host management station 302 may also be implemented on such as computer 200 and, in fact, both the host management station function and the DLS 400 management station function may be consolidated in a single computer such as computer 200, for example. In this illustrative embodiment, the DLS 400 management station 302 operates in conjunction with a simulator 304. The simulator 304 may be an ADSL Wireline Simulator such as a Consultronics DLS 400 available from Consultronics, Inc., of Stone Mountain, Ga. In this illustrative embodiment the station 302 provides the loop characterization data previously described to the simulator 304. Modems 306 and 308, which may be the same model modem produced by the same manufacturer, are situated on either side of the simulator 304. In this illustrative diagram the ADSL modems 306 and 308 are AW 910 models, available from Aware Inc., of Bedford, Mass. The modems transmit data to one another through loops simulated by the simulator 304 to have the characteristics of loops similar to reference loops. Bit error rate testers 310 and 312, such as "Fireberd 6000A" testers available from Telecommunications Techniques Corporation, of Germantown, Maryland, determine the bit error rates achieved by the modems 306 and 308 under various conditions for various simulated loops. The host 302 coordinates the simulation and provides test results, in the form of modem qualification data, which may be formatted in a qualification database, for example.

Figure 4:
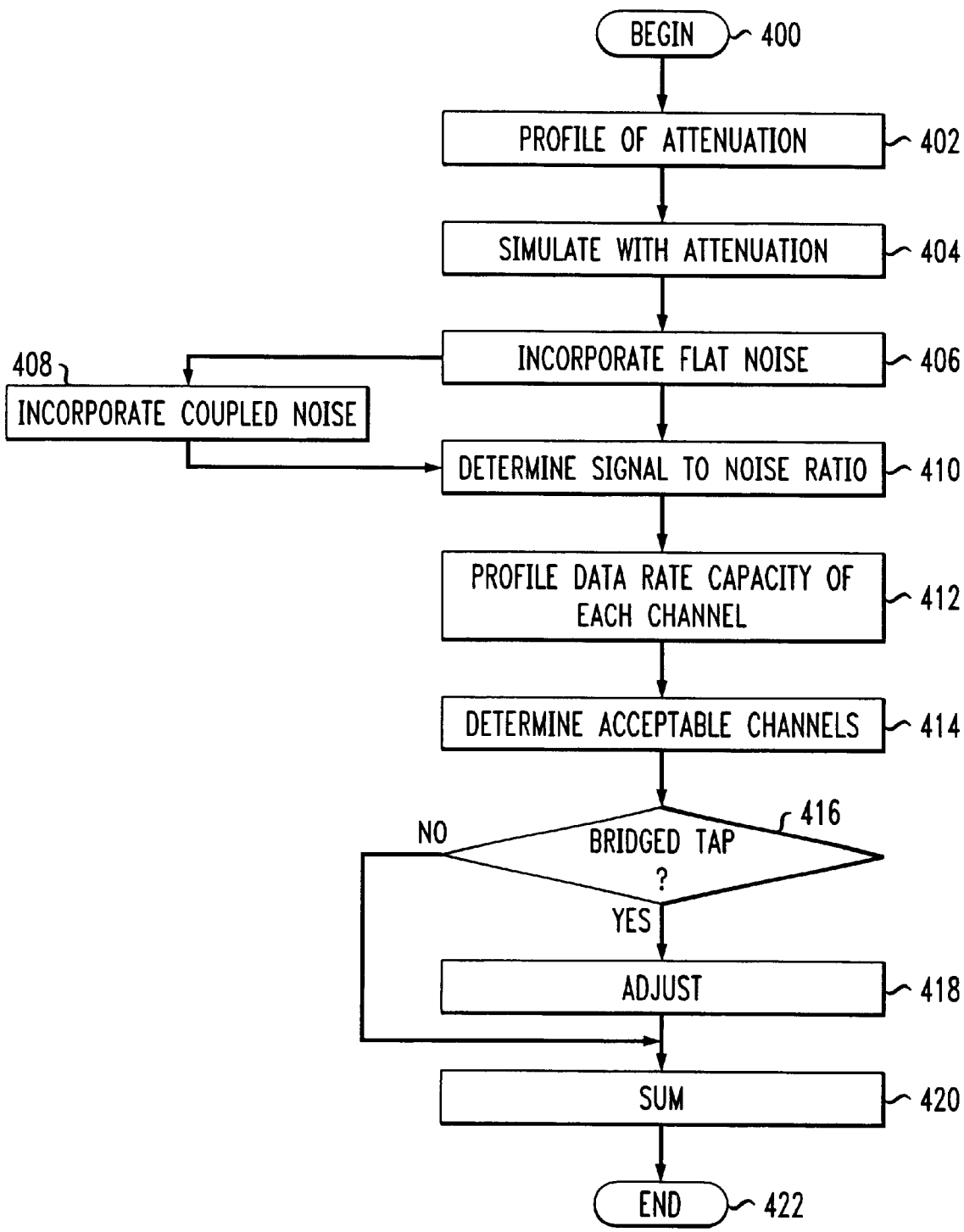
FIG. 4 is a flow chart of a loop characterization process in accordance with the principles of the present invention.

The flowchart of FIG. 4 illustrates in greater detail the process of applying the results of the wideband testing of the reference loop to the simulation of data transmission through similar loops. In particular, the process begins in step 400 and proceeds to step 402 where, using the data gathered during testing of the reference loop, a profile of attenuation versus frequency is developed. In step 404 the profile is applied to the simulation of similar loops, for example, other loops within the same binder group as the reference loop. In accordance with the principles of the invention, the attenuation profile is applied to a loop simulation across a signal frequency range, such as an ADSL signal frequency range. Additionally, in step 406 the flat noise, measured on the reference loop, is applied across the signal frequency range in the simulation, and in step 408 the coupled noise measured on the reference loop, which exhibits a power spectral density that varies with frequency, is also applied to the simulated loop. In step 410 the signal-to-noise ratio (SNR) at the center frequency of each channel, or channel frequency, within the signal frequency range is then computed, taking into account the attentuation versus frequency, the flat noise, and the coupled noise.

With the SNR thus computed, in step 412 a profile of the data transmission capacity of each of the channels at an acceptable BER is developed, yielding a distribution of capacity versus frequency. In step 414 a threshold value that yields a predetermined acceptable bit error rate (BER) is determined. If the SNR in any channel yields a BER below this threshold, the channel is discarded. That is, any channel in which the threshold bit error rate cannot be maintained will be ignored when computing the data transmission capacity of the loop.

In step 416 it is determined whether the loop includes a bridged tap. If the loop includes a bridged tap, the process proceeds to step 418 where the data rate capacity is adjusted to account for the reflection noise on the loop due to the bridged tap. In making this adjustment, the standing wave frequency on the bridged tap is determined by adjusting the measured capacitance length with the measured physical length of the tap. The resulting length determines the standing wave frequency, and the data rate at this frequency is adjusted to account for the reflection noise of the bridged tap. From step 418 the process proceeds to step 420, where it would proceed from step 416 had the loop had no bridged tap. In step 420 the data rates of all the channels, except those excluded in step 414, are summed to yield the total predicted safe data transmission rate. The process then proceeds to end in step 422.

Figure 5:
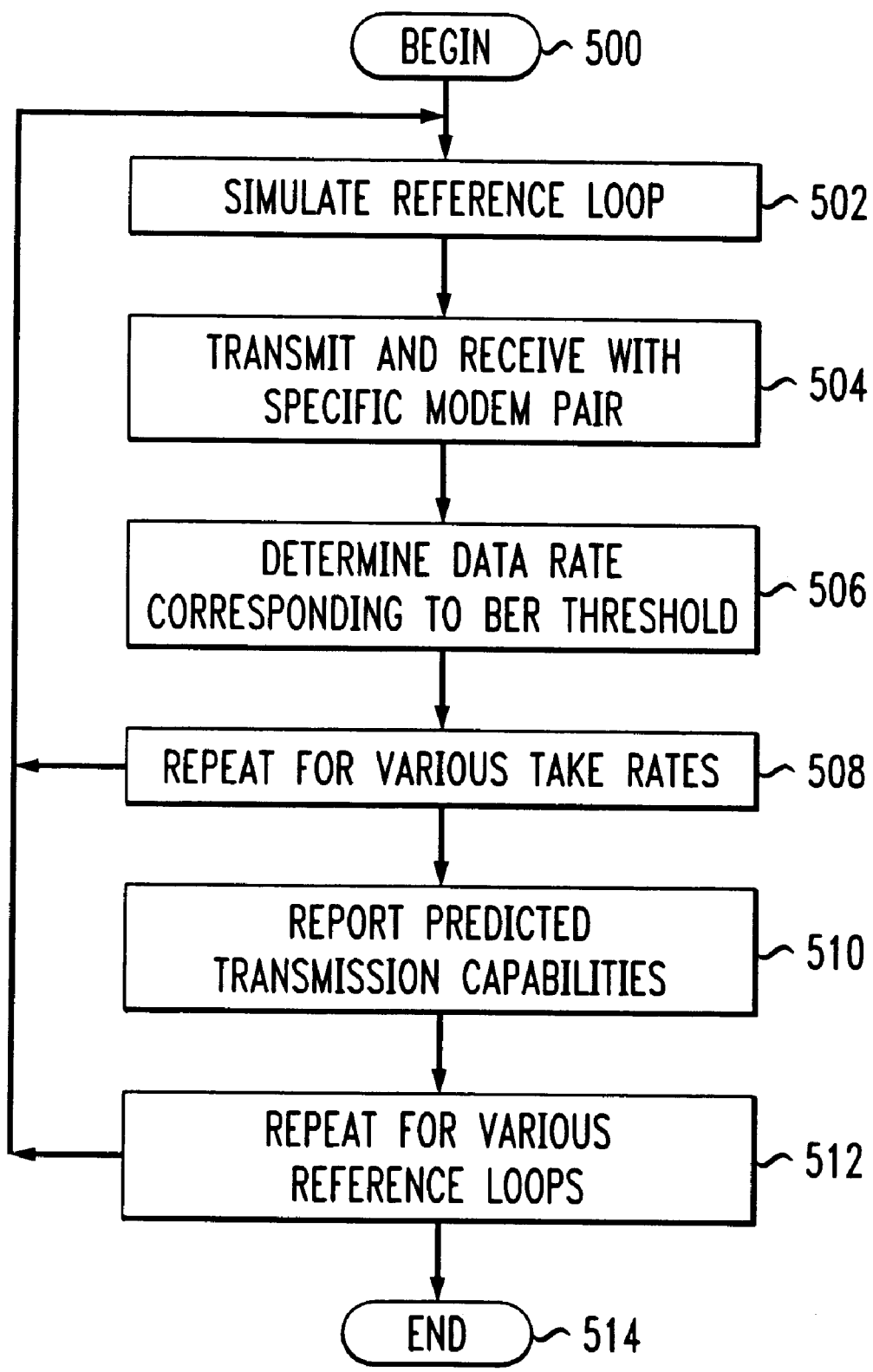
FIG. 5 is a flow chart of a modem qualification process in accordance with the principles of the present invention.

In accordance with another aspect of the invention, one or more digital subscriber line modems may be qualified on the tested loop and, by extension, on similar loops. "Similar loops" may be loops within the same binder group, or loops that, although geographically diverse, are associated with field-tested loops that have substantially similar transfer functions, for example. The process of modem qualification is illustrated in greater detail in the flowchart of FIG. 5 in which the process begins in step 500 and proceeds from there to step 502. In step 502 a reference loop is simulated using the characterization described in relation to the discussion of FIG. 4. Wideband noise, such as noise induced on the reference loop by AM broadcast, and noise coupled from other loops within a binder group is included in the simulation. As previously described, the characterization may also include the development of a transfer function that reflects the results of the field testing of the reference loop, and this transfer function may be employed in the reference loop simulation. The simulation also assumes a predetermined take rate.

In step 504 a pair of the type of modems that are to be qualified transmit and receive through the simulated reference loop. In step 506 data is transmitted through the simulated loop at increasing rates as the bit error rate is monitored. When a threshold acceptable bit error rate is encountered, the corresponding data transmission rate is determined to be the maximum data transmission rate for modems of that type on loops similar to the reference loop. For example, in an illustrative embodiment the data rate is increased until a bit error rate of $10^{-7}$ is encountered. In such a case, that type of modem is qualified for the data rate that produces a bit error rate of $10^{-7}$. The modem "type" may include brand and model number, since performance may vary from manufacturer to manufacturer of modems that nominally meet the same specifications.

From step 506 the process proceeds to step 508 where the operation may return to step 504 and the simulation for a different take rate. The process continues to loop in this fashion until simulations are performed for a predetermined set of take rates. From step 508 the process proceeds to step 510 where the results of the qualification for the S reference loop and similar loops are provided, in tabular form, in a database, or other format. As previously mentioned a computer such as the computer 200 of FIG. 2 may be employed to monitor the bit error rate testers and to provide the desired qualification reports.

From step 510 the process proceeds to step 512 where the operation may return to step 504 and simulations, including those at different take rates, may be performed for all reference loops within a telephone office. In accordance with the principles of the present invention, a variety of modem types may be qualified in this manner for the various loops within a given telephone office, at various take rates. The process proceeds to completion in step 514 when one or more modems of interest have been qualified for at least one reference loop at at least one take rate.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A method comprising the steps of:
   (A) grouping local telecommunications loops terminated in a central office into binder groups comprising loops subject to similar transmission conditions,
   (B) selecting a local telecommunications loop from each of said binder groups,
   (C) field testing the selected telecommunications loop from each binder group,
   (D) using a computer to characterize the selected loop of each binder group, based on the field test results, and
   (E) predicting a data communications capacity of at least one other similar loop within the same binder group of the selected local telecommunication loop, based on the characterization of step (D).

2. The method of claim 1 wherein the similar loop of step E is terminated in the same telephone central office as the field-tested loop.

3. The method of claim 1 wherein step C includes wideband noise testing of the selected loop.

4. The method of claim 2 wherein the step of characterizing includes the development of a transfer function for the loop, based on the field testing of step C.

5. The method of claim 4 wherein a similar loop of step E includes a loop having a substantially similar transfer function and substantially similar values of loop plant characteristics.

6. The method of claim 4 wherein loops within the same geographically diverse route are categorized as similar loops.

7. The method of claim 4 wherein step C includes the field testing of a selected loop for predetermined signal frequencies within a predetermined bandwidth.

8. The method of claim 1, wherein step A includes:

(A1) grouping loops terminated in a central office into a number X of geographically diverse routes, (A2) grouping loops within a geographically diverse route into a number Y of binder post locations, (A3) grouping loops within a binder post location into Z binder groups, and (A4) grouping W loops in each binder group.

9. The method of claim 8 wherein W=50, X=6, Y=10, and Z=10.

10. The method of claim 1 wherein step D includes:

(D1) developing a transfer function for a category of loops similar to the field tested loop.

11. The method of claim 10 wherein step D includes:

(D2) characterizing each category of loop for predetermined signal frequencies.

12. The method of claim 11 wherein the predetermined signal frequencies are usable signal frequencies within a selected modem bandwidth.

13. The method of claim 12 wherein the field testing includes wideband noise testing.

14. The method of claim 1 wherein step E includes:

employing a bit error rate performance threshold to determine a range of data rate capabilities.

15. The method of claim 1 further comprising the step of:

(F) qualifying a modem for a category of loops over a predetermined data rate range.

16. The method of claim 15 wherein step F includes:

(F1) providing a range of data rates for a category of loops at a given take rate.

17. A method of characterizing telecommunications local loops comprising the steps of (A) grouping local telecommunications loops terminated in a central office into binder groups comprising loops subject to similar transmission conditions, (B) field testing a local loop in each of said binder groups to determine the level of wideband noise on the local loop;

(C) forming a transfer function that reflects the field test measurements; and (D) associating the transfer function of step (C) with similar local loops within the same binder group of the local loop.

18. An apparatus comprising:

a field tester configured to perform a wideband noise test on a local telecommunications loop, wherein said local telecommunications loop belonging to a binder group; and a computer configured to group local telecommunications loops terminated in a central office into binder groups comprising loops subject to similar transmission conditions, to receive the results of the wideband noise test, to characterize the tested loop, and to predict a data communications capacity of at least one similar loop within the same binder group of the tested loop, based on the characterization of the tested loop.

19. Apparatus of claim 18 wherein said field tester is further configured to perform a signal frequency test on said local telecommunications loop.

20. Apparatus of claim 18 wherein said computer is configured to develop a transfer function for the tested loop, based on said field test.

21. Apparatus of claim 19 wherein said computer is configured to characterize a loop for a set of predetermined signal frequencies.

22. Apparatus of claim 18 wherein said computer is configured to determine a range of data rate capabilities using a bit error rate performance threshold.

23. Apparatus of claim 18 wherein said computer is configured to simulate a modem for operation on the loop, using the loop characterization.

24. Apparatus of claim 23 wherein said computer is configured to report a range of data rates for a category of loops similar to the characterized loop at a given take rate.

25. The method of claim 15 wherein step E includes the step of:

E1 employing automated data for a loop in predicting the data rate capability of that loop.

26. The method of claim 15 wherein step E includes the step of:

E2 employing loop makeup data for a loop in predicting the data rate capability of that loop.

27. The method of claim 25 wherein said automated data is mechanized loop testing data.

28. The method of claim 26 wherein said loop makeup data is loop facilities assignment and control system (LFACS) data.

29. The method of claim 1, wherein said transmission conditions comprise the geographical locations of said loops.

30. The method of claim 1, wherein said transmission conditions comprise environmental factors effecting the data rate capability of said loops.

31. The method of claim 30, wherein said environmental factors comprise electrical noise.

* * * * *